United States Patent [19]

Golarz

[11] Patent Number: 5,546,828
[45] Date of Patent: Aug. 20, 1996

[54] PARKING BRAKE

[75] Inventor: B. Paul Golarz, Ajax, Canada

[73] Assignee: Atoma International Inc., Newmarket, Canada

[21] Appl. No.: 373,572

[22] Filed: Jan. 13, 1995

[51] Int. Cl.⁶ .................. G05G 1/14; G05G 5/06
[52] U.S. Cl. .............. 74/512; 74/529; 74/540; 74/575; 74/516; 74/535
[58] Field of Search .............. 74/512, 513, 516, 74/535, 536, 539, 533, 540, 541, 560

[56] References Cited

U.S. PATENT DOCUMENTS

| | | | |
|---|---|---|---|
| 4,850,242 | 7/1989 | Hass et al. | 74/512 |
| 5,131,288 | 7/1992 | Barlas | 74/512 |
| 5,211,072 | 5/1993 | Barlas et al. | 74/512 |
| 5,280,734 | 1/1994 | Riffle et al. | 74/540 X |
| 5,309,786 | 5/1994 | Pare et al. | 74/513 X |
| 5,335,563 | 8/1994 | Yamamoto et al. | 74/560 X |
| 5,448,928 | 9/1995 | Harger | 74/516 X |

FOREIGN PATENT DOCUMENTS

| | | | |
|---|---|---|---|
| 0345958 | 12/1989 | European Pat. Off. | 74/512 |
| 2-39214 | 2/1990 | Japan | 74/512 |
| 5-131905 | 5/1993 | Japan | 74/512 |

*Primary Examiner*—Vinh T. Luong
*Attorney, Agent, or Firm*—Cushman, Darby & Cushman

[57] ABSTRACT

A parking brake mechanism having a spring pressed rotary assembly providing a cable connection movable in opposite directions within an arcuate path and a cylindrical surface movable in opposite directions within the plane of the cylindrical surface in conjunction with the movement of the cable connection. A helical coil spring is provided having a series of volutes constructed and arranged to be biased to engage the exterior cylindrical surface and a movable end portion constructed and arranged to be moved from a normal inoperative position into a volute-disengaging position wherein the normal biased engagement of the volutes with the exterior cylindrical surface is relieved to allow the cylindrical surface to move in opposite directions within the plane thereof and the cable connection to move in opposite directions within the arcuate path thereof and the movable end portion is constructed and arranged with respect to an abutment and a lever assembly which carries the rotary assembly such that (1) when the lever assembly is in a brake-releasing position the movable end portion is maintained by the abutment in the volute-disengaging position thereof to allow the cable connection to move within the arcuate path thereof in opposite directions to maintain a desired slack tension on a cable connected therewith and (2) when the lever assembly is out of the brake-releasing position thereof the movable end portion is maintained in the normal inoperative position thereof so that during the movement of the lever assembly out of the brake-releasing position thereof into a brake-applying position thereof the cable connection will pull a cable connected thereto.

14 Claims, 5 Drawing Sheets

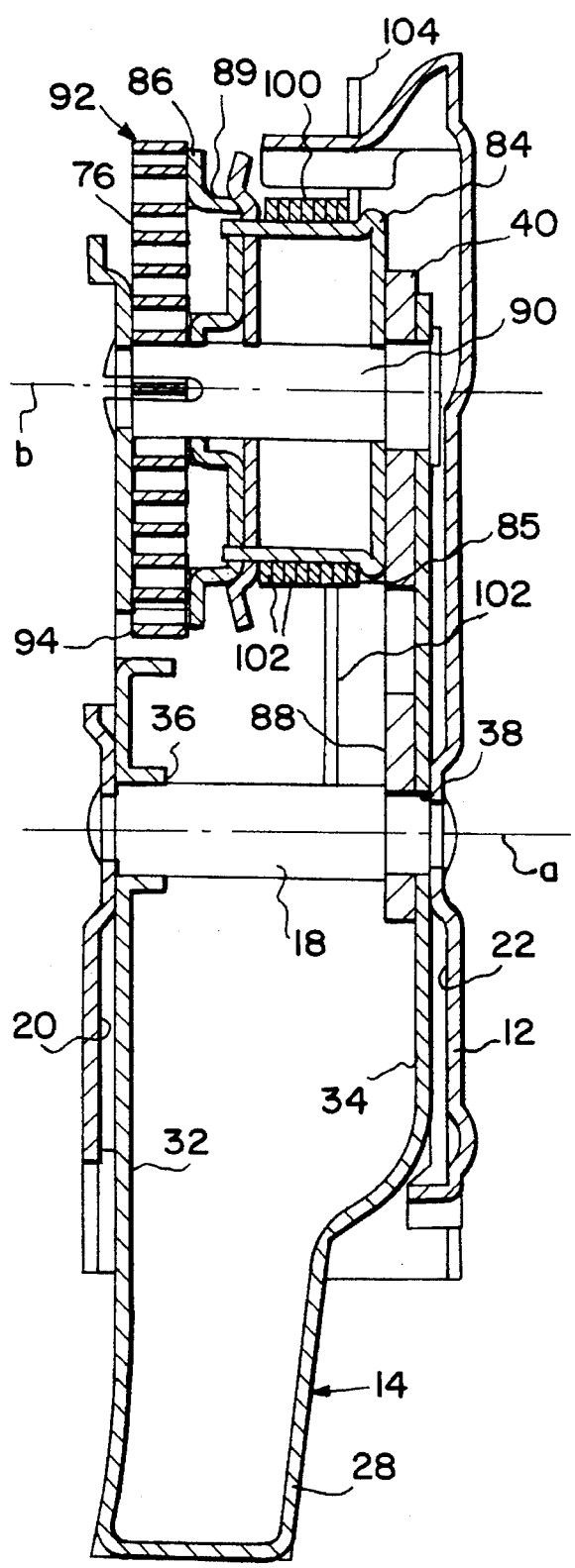
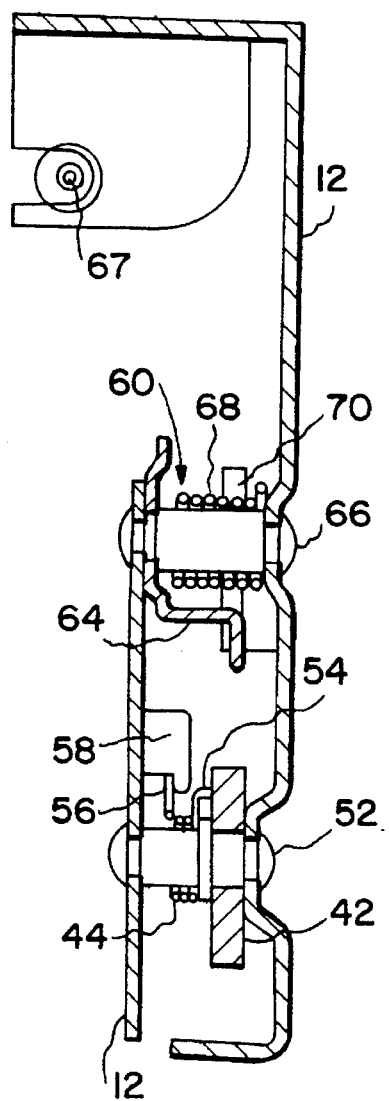
FIG. 2
FIG. 3

PARKING BRAKE

BACKGROUND OF THE INVENTION

1. Field of the Invention

This invention relates to parking brake mechanisms and more particularly to parking brake mechanisms of the type suitable to actuate a remote cable-operated brake mechanism.

2. Description of the Related Art

Parking brake mechanisms for actuating cable-operated brake mechanisms are known and used commercially in motor vehicles. An example of such a parking brake mechanism is disclosed in U.S. Pat. No. 5,211,072. The parking brake mechanism disclosed in the '072 patent includes a variable ratio lever arrangement and an automatic slack take-up system. The automatic slack take-up system includes a take-up reel to which is attached one end of the cable for operating the remote cable-operated brake mechanism. The take-up reel has fixed thereto a segmental ratchet member having a series of arcuately arranged ratchet teeth along an outer periphery thereof. The take-up reel and ratchet member are mounted on the actuating lever for movement about an axis which is disposed in spaced parallel relation to the pivotal axis of the lever. A spring-pressed pawl is pivotally mounted on the lever adjacent the ratchet member in a position to be biased into engagement with one of the ratchet teeth. An abutment pin carried by the frame on which the lever is mounted serves to hold the spring-pressed pawl out of tooth engagement when the lever is in the normal brake-releasing position thereof. A coil spring is connected between the take-up reel and the lever to bias the cable in a direction to tension the same and hence automatically apply a predetermined slack tension to the cable commensurate with the strength of the coil spring. When the lever is moved out of the normal brake-releasing position, the pawl moves away from the abutment and into engagement with a ratchet tooth to thereby prevent turning of the take-up reel and insure that the cable will be pulled with the lever to apply the brakes when the lever is moved into a brake-applying position thereof. Because the stoppage of the take-up reel must be accomplished by the engagement of the end of a pawl with a ratchet tooth, there exists the possibility that the pawl may engage just the very tip of a ratchet tooth rather than to be moved fully into the trough between two teeth for full tooth engagement. A tooth tip engagement of the pawl is susceptible of slipping from engagement of the tooth tip and allowing take-up reel movement to release the cable-operated brake mechanism before the pawl can be biased into full engagement with another tooth.

SUMMARY OF THE INVENTION

An object of the present invention is to provide a parking brake mechanism for operating a vehicle cable-operated brake mechanism which provides for automatic take-up of the slack tension of the cable while eliminating the problem of drive pawl skipping described above. In accordance with the principles of the present invention, this objective is achieved by providing a parking brake mechanism for a vehicle having a cable-operated brake mechanism comprising a frame structure constructed and arranged to be fixedly mounted in the vehicle, and a lever assembly pivotally mounted on the frame structure for pivotal movement about a pivotal axis between a brake-releasing position and a range of different brake-applying positions. The lever assembly provides a series of ratchet teeth corresponding with the brake-applying positions. The ratchet teeth being constructed and arranged to extend in a row arcuate about the pivotal axis of the lever assembly. A pawl is pivotally mounted on the frame structure and spring biased to move into engagement with a corresponding ratchet tooth when the lever assembly is moved into a brake-applying position to releasably retain the lever assembly in the brake-applying position.

An actuatable releasing mechanism is operatively associated with the pawl to move the pawl out of tooth engagement to permit the lever assembly to return to the brake-releasing position thereof.

The parking brake mechanism also includes a rotary assembly providing a cable connection movable in opposite directions within an arcuate path and a cylindrical surface mounted on the lever assembly in spaced parallel relation to said pivotal axis and movable in opposite directions within the plane of the cylindrical surface in conjunction with the movement of the cable connection. The cable connection is constructed and arranged to fixedly connect therewith one end of a cable which extends to the cable-operated brake mechanism so that when the cable connection moves in the arcuate path (1) in one direction a cable connected thereto will be moved in a direction to increase the tension in the cable and (2) in an opposite direction a cable will be moved in a direction to slacken the tension in the cable.

A spring system acting on the rotary assembly is constructed and arranged to resiliently bias (1) the cable connection to move within the arcuate path thereof in one direction so as to apply a predetermined slack tension to a cable connected therewith and the exterior cylindrical surface to move in a direction corresponding with the one direction of the cable connection.

The parking brake mechanism also includes a helical coil spring having a series of volutes constructed and arranged to be biased to engage the exterior cylindrical surface. The helical coil spring is constructed and arranged to enable the helical coil spring volutes to frictionally engage the exterior cylindrical surface to prevent movement of said cylindrical surface in a direction corresponding with the opposite direction of movement of the cable connection. The helical coil spring has a movable end portion constructed and arranged to be moved from a normal inoperative position into a volute-disengaging position wherein the normal biased engagement of the volutes with the exterior cylindrical surface is relieved to allow the exterior cylindrical surface to move in opposite directions within the plane thereof and the cable connection to move in opposite directions within the arcuate path thereof. The movable end portion of the helical coil spring is arranged to engage an abutment. The lever assembly, the abutment and the movable end portion of the helical coil spring are constructed and arranged such that (1) when the lever assembly is in the brake-releasing position thereof the movable end portion of the helical coil spring is maintained by the abutment in the volute-disengaging position thereof to allow the cable connection to move within the arcuate path thereof in opposite directions to maintain a desired slack tension on a cable connected therewith and (2) when the lever assembly is out of the brake-releasing position thereof the movable end portion of the helical coil spring is maintained in the normal inoperative position thereof so that during the movement of the lever assembly out of the brake-releasing position thereof into a brake-applying position thereof the cable connection will pull a cable connected thereto into brake operating relation with the cable-operated brake mechanism.

Another object of the present invention is the provision of a parking brake mechanism of the type described which is simple in construction, effective in operation and economical to manufacture and maintain.

These and other objects of the present invention will become more apparent during the course of the following detailed description and appended claims.

The invention may best be understood with reference to the accompanying drawings wherein an illustrative embodiment is shown.

BRIEF DESCRIPTION OF THE DRAWINGS

FIG. 2 is an enlarged sectional view taken along the line 2—2 of FIG. 1;

FIG. 3 is an enlarged fragmentary sectional view taken along the line 3—3 of FIG. 1;

DESCRIPTION OF THE PREFERRED EMBODIMENT

Figure 1:
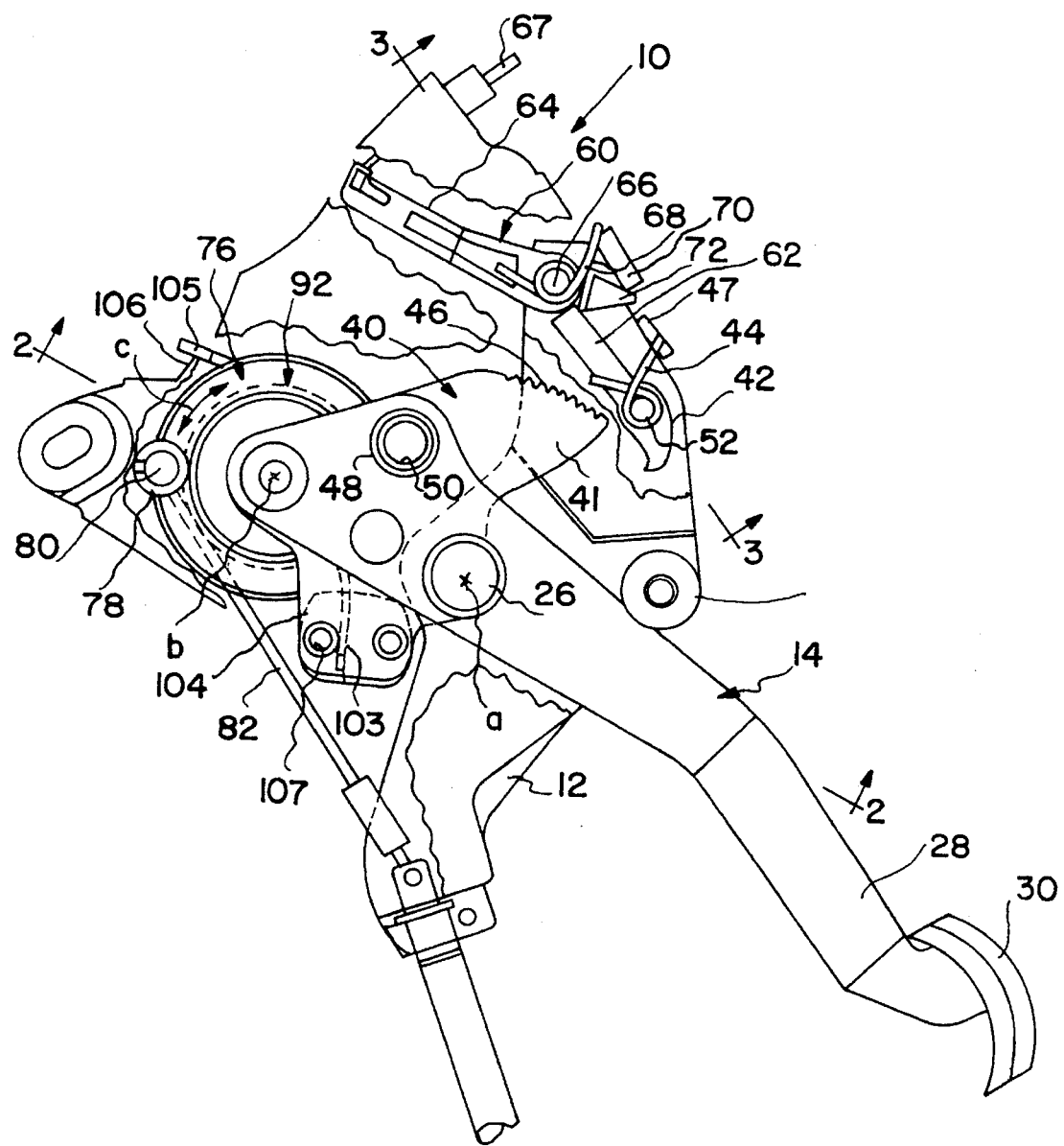
FIG. 1 is a left side elevational view of a parking brake mechanism embodying the principles of the present invention with parts broken away for purposes of clearer illustration and the lever assembly being shown in the brake releasing position thereof.
Figure 6:
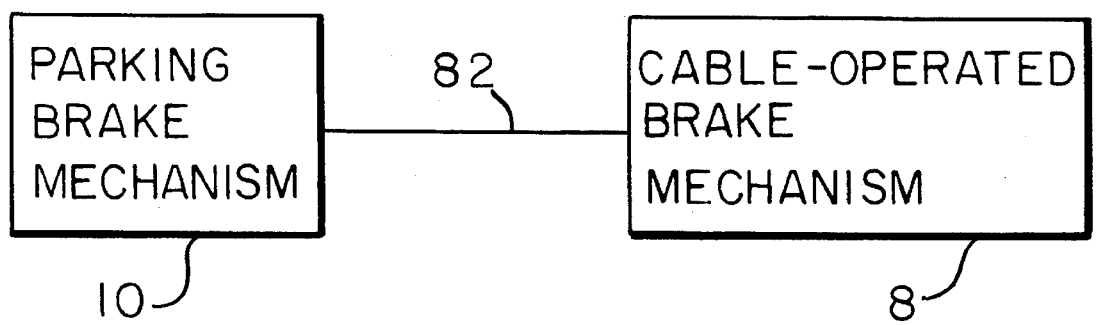
FIG. 6 is a block diagram schematically representing the parking brake mechanism of the present invention in conjunction with a cable-operated brake mechanism.

Referring now more particularly to the drawings, there is shown in FIG. 6 a parking brake mechanism, generally indicated at 10, for actuating a cable-operated brake mechanism of a vehicle, generally indicated at 8. As shown in FIG. 1, the mechanism 10 includes frame structure 12 constructed and arranged to be fixedly mounted to the vehicle. A lever assembly, generally indicated at 14, is pivotably mounted on the frame structure 12 for movement about a pivotal axis (a) between a brake-releasing position and a range of different brake-applying positions. The lever assembly 14 is mounted to the frame structure 12 by a main rivet 18 which extends between the side walls 20 and 22 of the frame structure 12 to hold the lever assembly 14 in place on the frame structure 12 against axial displacement relative thereto. The longitudinal center of the rivet 18 defines the pivot axis (a). The lever assembly 14 includes a pedal 28 including a rubber pad 30 mounted at the end thereof for engagement by a driver's foot to operate the brake mechanism, as will be appreciated more fully below. The pedal 28 has an inverted U-shape, with spaced flanges 32 and 34, each including aligned holes 36 and 38 for receiving the rivet 18. A rubber stopper 39 limits movement of the pedal 28 in one direction.

The lever assembly 14 provides a releasing latch mechanism, generally indicated at 40, which includes a sector gear member 41, a pawl 42 pivotally mounted on the frame structure 12 and a pawl spring 44 biased to move the pawl 42 into engagement with a series of ratchet teeth 46 defined on the sector gear member 41. As shown in FIG. 2, the sector gear member 41 is fixed to the pedal 28 via flange 48 extending through a bore 50 in the sector gear member 41 so as to fixedly couple the sector gear member 41 to the pedal 28 for movement therewith. Further, the sector gear member 41 is mounted to the rivet 18 so as to pivot with the pedal 28.

The ratchet teeth 46 of the sector gear member 41 are constructed and arranged to extend in a row arcuate about the pivot axis (a) of the lever assembly 14. A rivet 52 mounted to the frame structure 12 provides a pivoting support for the pawl 42. As noted above, the pawl 42 is biased into an engaging position with the ratchet teeth 46 by pawl spring 44. One end 54 of spring 44 engages the back end of the pawl 42 while the other end 56 of the spring 44 engages a protrusion 58 fixed to the frame structure 12. The spring 44 is a torsion spring biasing the pawl 42 to rotate into engagement with the ratchet teeth 46.

Figure 4:
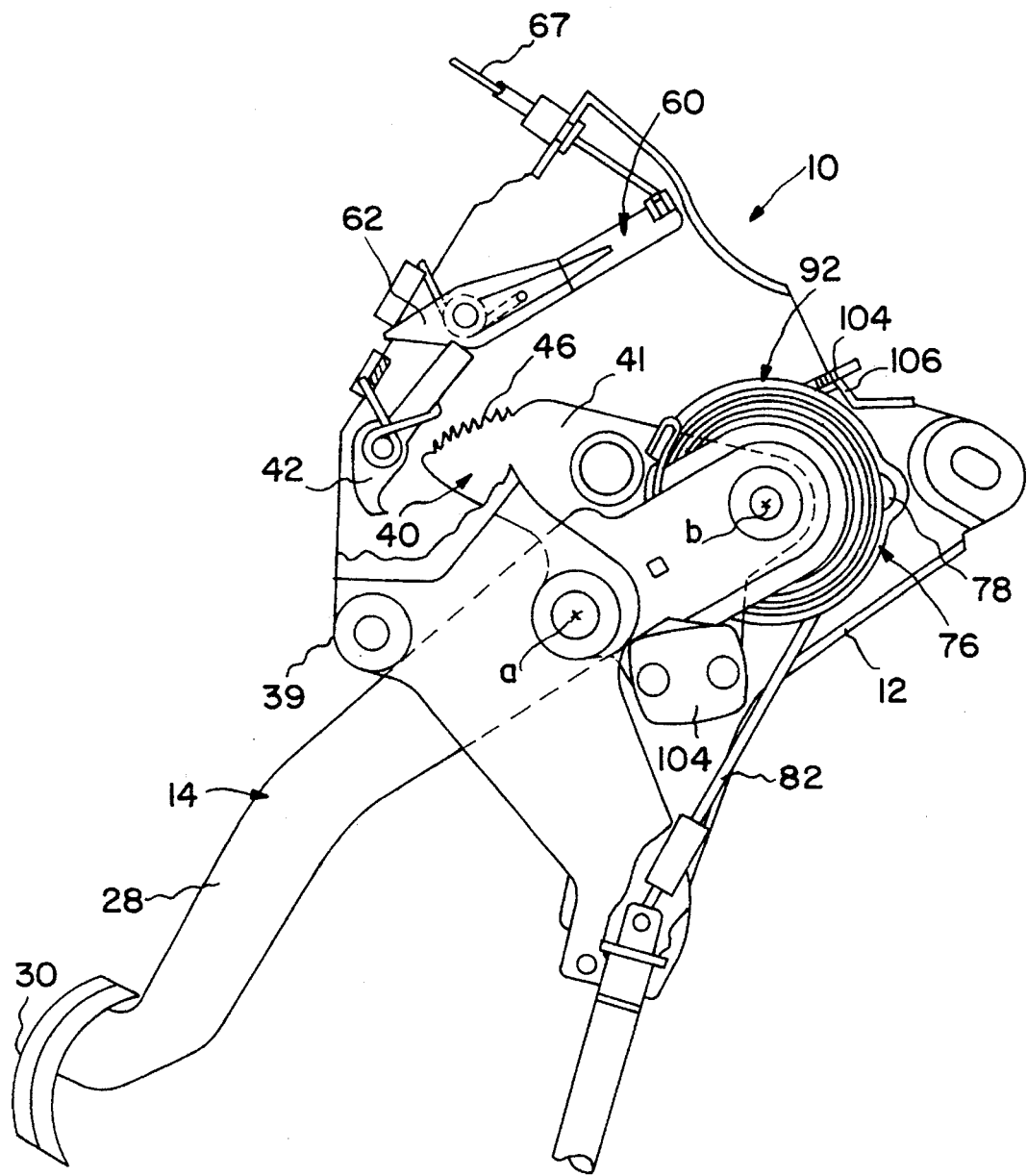
FIG. 4 is a right side elevational view similar to FIG. 1.

An actuatable releasing mechanism, generally indicated at 60, is operatively associated with an elongated portion 62 of the pawl 42 to move the pawl 42 out of tooth engagement with the ratchet teeth 46 to permit the lever assembly 14 to return to its brake releasing position. The actuatable releasing mechanism 60 includes a releasing lever 64 pivoted on the frame structure 12 via rivet 66. One end of the releasing lever 64 is coupled to a cable 67 so as to be actuated to move from a normally inoperative position to a releasing position. The actuatable releasing mechanism 60 includes a torsion spring 68 biasing the releasing lever 64 towards its inoperable position. One end of the spring 68 is coupled to the releasing lever 64 while the other end of the spring 68 is in contact with protrusion 70 of the frame structure 12. In the inoperable position, end 72 of the releasing lever 64 is in contact with the protrusion 70. With reference to FIG. 1, the spring pressed pawl 42 is engaged by the end 72 of the releasing lever 64 so as to be moved out of engagement with a ratchet tooth once the releasing lever 64 is actuated and moved into a releasing position thereof. Manual pull on cable 67 moves the releasing lever 64 from its normally inoperable position into its releasing position (FIG. 4). Thus, when the pawl 42 is moved out of tooth engagement, the lever assembly 14 will return to its brake-releasing position.

The parking brake mechanism 10 includes a rotary assembly, generally indicated at 76, defining a unitary structure. As shown in FIG. 2, the rotary assembly 76 is mounted between wall 32 of the pedal portion 28 and wall 88 of the sector gear member 41. A rivet 90 is provided for coupling the rotary assembly 76 on the lever assembly 14 so as to be rotatable with respect thereto. A longitudinal axis of the rivet 90 defines a rotational axis (b) of the unitary structure 76 which is disposed in spaced, parallel relation to the pivot axis (a) of the lever assembly 14. The unitary structure or rotary assembly 76 includes a flange or cable connection 78 which is moveable in opposite directions within an arcuate path (c). The cable connection 78 is constructed and arranged to fixedly connect therewith one end 80 of a cable 82 which extends to a cable operated brake mechanism (not shown) so that when the cable connection 78 moves in the arcuate path (c) in one direction, the cable 82 connected thereto will be moved in a direction to increase the tension in the cable and when moved in an opposite direction, the cable 82 will be moved in a direction to slacken the tension therein.

One side of the unitary structure 76 is defined by a cylindrical member 84 which provides an exterior cylindrical surface 85 which is disposed in spaced parallel relation to the pivot axis (a) and moveable in opposite directions within a plane of the cylindrical surface 85, in conjunction with movement of the cable connection 78. As shown, the cable connection 78 is provided at a peripheral location on a remaining side 86 of the unitary structure 76.

The remaining side 86 of the unitary structure 76 includes an outwardly facing surface 89 extending from the cable connection 78 at the peripheral location thereof in an arcuate direction about the axis of the rotary assembly 76. The outwardly facing surface 89 is constructed and arranged to guidingly engage one end portion of the cable 82 connected to the cable connection 78 as the cable 82 is moved in the arcuate path (c).

A spring system, generally indicated at 92, acts on the rotary assembly and is constructed and arranged to resiliently bias the cable connection to move within the arcuate path (c) thereof in the first direction so as to apply a predetermine a slack tension to the cable 82 connected therewith and resiliently bias the exterior cylindrical surface 85 to move in a direction corresponding with the above-mentioned one direction of the cable connection 78.

Figure 5:
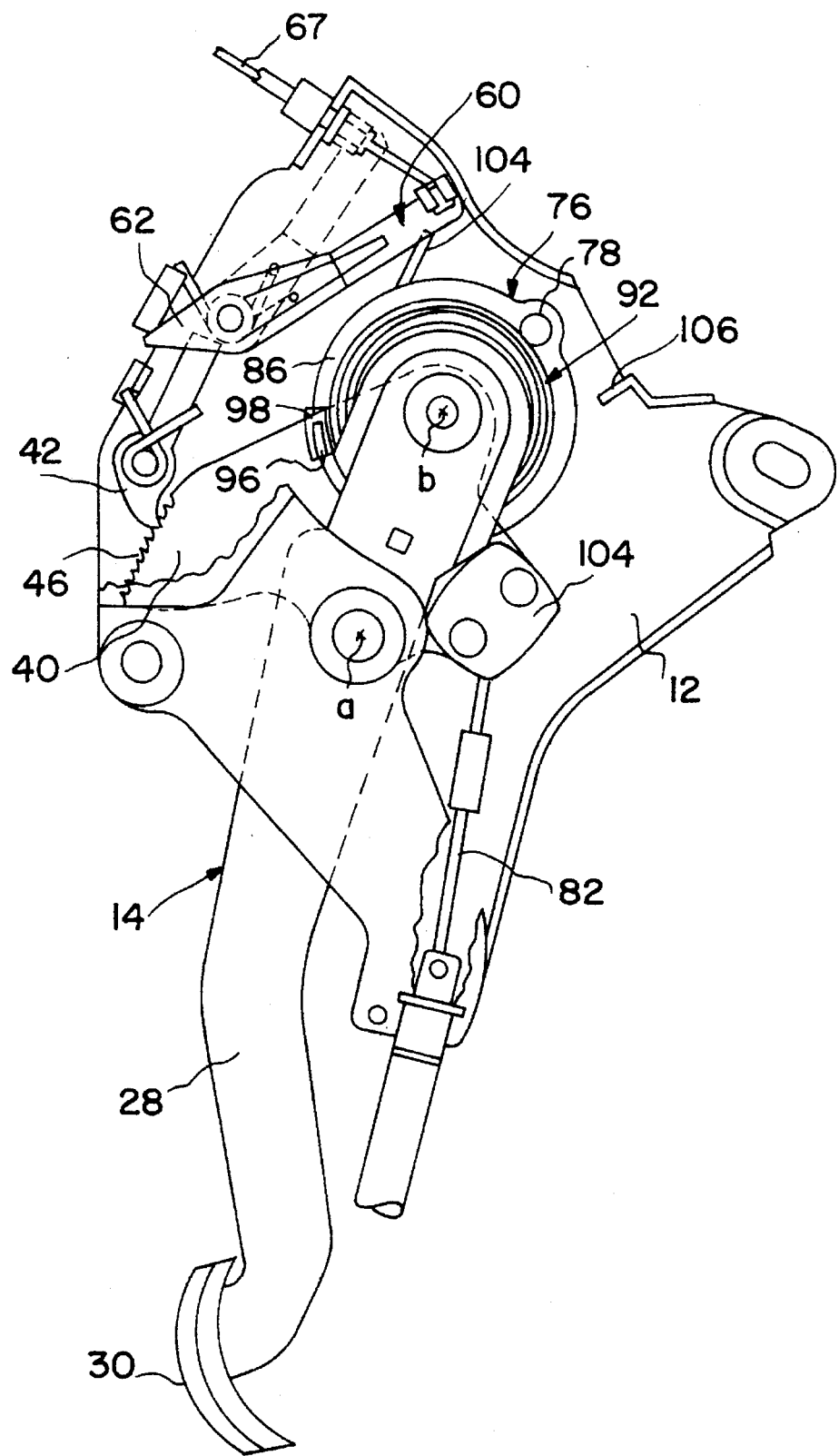
FIG. 5 is a view similar to FIG. 4 showing the lever assembly in a brake applying position thereof with the releasing mechanism shown in solid lines in the tooth engaging position thereof and in dotted lines in the releasing position thereof.

As shown in FIG. 2, the spring system 92 includes a spiral spring 94 connected to the remaining side 86 of the unitary structure 76, at projection 96. As shown in FIG. 5, the end 98 of the spiral spring 94 is hooked onto the projection 96.

A helical coil spring 100 having a series of volutes 102 is constructed and arranged to be biased to engage the exterior cylindrical surface 85. The helical coil spring 100 enables the helical coil spring volutes 102 to frictionally engage the exterior cylindrical surface 85 to prevent movement of the same in a direction corresponding with the opposite direction of movement of the cable connection 78. An end of the helical coil spring defines a moveable end portion 105 which extends generally tangently from an end volute of the series of volutes 102 of the helical coil spring 100. The series of volutes includes an opposite end volute 103 extending generally tangently therefrom and fixed to the sector gear segment 41 via clamping flange 104 which is clamped to segment 41 by a pair of rivets 107.

An abutment 106 is provided on the frame structure 12 and is constructed and arranged to engage the moveable end portion 105 of the helical coil spring 100, which will become more apparent below. The moveable end portion 105 is constructed and arranged to be moved from a normal, inoperable position into a volute disengaging position wherein the normally biased engagement of the volutes 102 with the exterior cylindrical surface 85 is relieved to allow the exterior cylindrical surface 85 to move in opposite directions within the plane thereof and the cable connection 78 to move in opposite directions within the arcuate path thereof.

The operation of the parking brake mechanism 10 will be appreciated with respect to FIGS. 4 and 5. As shown in FIG. 4, the lever assembly 4, the abutment 106 and the moveable end portion 105 of the helical coil spring 100 are constructed and arranged such that when the lever assembly 14 is in the brake-releasing position (FIG. 4), the moveable end portion 105 of the helical coil spring 100 is maintained by the abutment 106 in the volutes disengaging position thereof to allow the cable connection 78 to move within the arcuate path (c) in opposite directions to maintain a desired slack tension on the cable 82 connected therewith. Further, with reference to FIG. 5, when the lever assembly 14 is out of the brake-releasing position thereof, the moveable end portion 105 of the helical coil spring 100 is maintained in the normal, inoperative position thereof so that during the movement of the lever assembly 14 out of the brake releasing position into a brake-applying position thereof, the cable connection 78 will pull the cable 82 connected thereto into brake operating relation with the cable operated brake mechanism (not shown).

Any U.S. patent applications or patents mentioned or cited hereinabove are hereby incorporated by reference into the present specification.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A parking brake mechanism for a vehicle having a cable-operated brake mechanism comprising a frame structure constructed and arranged to be fixedly mounted in the vehicle, a lever assembly pivotally mounted on said frame structure for pivotal movement about a pivotal axis between a brake-releasing position and a range of different brake-applying positions, said lever assembly providing a series of ratchet teeth corresponding with said brake-applying positions, said ratchet teeth being constructed and arranged to extend in a row arcuate about the pivotal axis of said lever assembly, a pawl pivotally mounted on said frame structure and spring biased to move into engagement with at least one of said ratchet teeth when said lever assembly is moved into any one of the brake-applying positions to releasably retain said lever assembly thereat, an actuatable releasing mechanism operatively associated with said pawl to move said pawl out of tooth engagement to permit said lever assembly to return to the brake-releasing position thereof, a rotary assembly providing a cable connection capable of movement in opposite directions within an arcuate path and an exterior cylindrical surface mounted on said lever assembly in spaced parallel relation to said pivot axis and capable of movement in opposite directions within the plane of said cylindrical surface in conjunction with the movement of said cable connection, said cable connection being constructed and arranged to fixedly connect therewith one end of a cable which is adapted to extend to the cable-operated brake mechanism so that when said cable connection moves in said arcuate path (1) in one direction the cable connected thereto will be moved in a direction to increase the tension in said cable and (2) in an opposite direction the cable will be moved in a direction to slacken the tension in said cable, a spring system acting on said rotary assembly constructed and arranged to resiliently bias (1) said cable connection to move within the arcuate path thereof in said one direction so as to apply a predetermined slack tension to the cable connected therewith and (2) said exterior cylindrical surface to move in a direction corresponding with the one direction of said cable connection, a helical coil spring having a series of volutes constructed and arranged to be biased to engage said exterior cylindrical surface, said helical coil spring being constructed and arranged to enable the helical coil spring volutes to frictionally engage said exterior cylindrical surface to prevent movement of said exterior cylindrical surface in a direction corresponding with the opposite direction of movement of said cable connection, said helical coil spring having an end portion constructed and arranged to be moved from a normal inoperative position into a volute-disengaging position wherein the normal biased engagement of the volutes with said exterior cylindrical surface is relieved to allow said exterior cylindrical surface to move in opposite directions within the plane thereof and said cable connection to move in opposite directions within the arcuate path thereof, and an abutment constructed and arranged to engage the end portion of said helical coil spring, said lever assembly, said abutment and the end portion of said helical coil spring being constructed and arranged such that (1) when said lever assembly is in the brake-releasing position thereof the end portion of said helical coil spring is maintained by said abutment in the volute-disengaging position thereof to allow the cable connection to move within said arcuate path in opposite directions to maintain a desired slack tension on the cable connected therewith and (2) when said lever assembly is out of the brake-releasing position thereof the end portion of said helical coil spring is maintained in the normal inoperative position thereof so that during the movement of said lever assembly out of the brake-releasing position thereof into one of said brake-applying positions thereof the cable connection will pull the cable connected thereto into brake operating relation with the cable-operated brake mechanism.

2. A parking brake mechanism as defined in claim 1 wherein said rotary assembly comprises a unitary structure.

3. A parking brake mechanism as defined in claim 2 wherein said exterior cylindrical surface is provided by said rotary assembly as a cylindrical member defining one side of said unitary structure, said cable connection being provided at a peripheral location on a remaining side of said unitary structure.

4. A parking brake mechanism as defined in claim 3 wherein the remaining side of said unitary structure includes an outwardly facing surface extending from said cable connection at the peripheral location thereof in an arcuate direction about the axis of said rotary assembly, said outwardly facing surface being constructed and arranged to guidingly engage said one end portion of the cable connected to said cable connection as said cable connection is moved in said arcuate path in said one direction.

5. A parking brake mechanism as defined in claim 4 wherein said spring system includes a spiral spring connected to the remaining side of said unitary structure.

6. A parking brake mechanism as defined in claim 1 wherein said end portion of said helical coil spring extends generally tangentially from an end volute of said series of volutes, said series of volutes including an opposite end volute having an opposite end portion extending generally tangentially therefrom and fixedly secured to said lever assembly.

7. A parking brake mechanism as defined in claim 1 wherein said actuatable releasing mechanism includes a releasing lever pivoted on said frame structure, said releasing lever being constructed and arranged to be actuated to moved from a normally inoperable position into a pawl-releasing position, said spring pressed pawl being constructed and arranged to be moved out of engagement with said at least one of the ratchet teeth by said releasing lever when said releasing lever is actuated and moved into the pawl-releasing position thereof.

8. A parking brake mechanism for a vehicle having a cable-operated brake mechanism comprising a frame structure constructed and arranged to be fixedly mounted in the vehicle, a lever assembly pivotally mounted on said frame structure for pivotal movement about a pivotal axis between a brake-releasing position and a range of different brake-applying positions, said lever assembly providing a series of ratchet teeth corresponding with said brake-applying positions, said ratchet teeth being constructed and arranged to extend in a row arcuate about the pivotal axis of said lever assembly, a pawl pivotally mounted on said frame structure and spring biased to move into engagement with at least one of said ratchet teeth when said lever assembly is moved into a brake-applying position to releasably retain said lever assembly in said brake-applying position, an actuatable releasing mechanism operatively associated with said pawl to move said pawl out of tooth engagement to permit said lever assembly to return to the brake-releasing position thereof, a rotary assembly mounted on said lever assembly for movement in opposite directions about a rotational axis disposed in spaced parallel relation to the pivotal axis of said lever assembly, said rotary assembly being constructed and arranged to fixedly connect therewith one end of a cable which is adapted to extend to said cable-operated brake mechanism so that when said rotary assembly is moved about the rotational axis thereof (1) in one direction one end portion of the cable connected thereto will be guidingly wrapped thereon and (2) in an opposite direction the one end portion of the cable will pay out therefrom, a spring system acting between said lever assembly and said rotary assembly constructed and arranged to resiliently bias said rotary assembly to move about the rotational axis thereof in said one direction so as to apply a predetermined slack tension to the cable connected therewith, said rotary assembly having an exterior cylindrical surface, a helical coil spring having a series of volutes constructed and arranged to be biased to engage said exterior cylindrical surface, said helical coil spring having a connection with said lever assembly constructed and arranged to enable the helical coil spring volutes to prevent movement of said rotary assembly about the rotational axis thereof in a direction to pay out the cable connected therewith, said helical coil spring having an end portion constructed and arranged to be moved from a normal inoperative position into volute-disengaging position wherein the normal biased engagement of the volutes with said exterior cylindrical surface is relieved to allow said rotary assembly to move about the rotational axis thereof in opposite directions, and an abutment on said frame structure constructed and arranged to engage the end portion of said helical coil spring during the movement of said lever assembly into and out of the brake-releasing position thereof so that (1) when said lever assembly is in the brake-releasing position thereof said end portion is maintained in the volute-disengaging position thereof to allow the rotary assembly to rotate in opposite directions to maintain a desired slack tension on the cable connected therewith and (2) when said lever assembly is out of the releasing position thereof said end portion is maintained in the normal inoperative position thereof so that during the movement of said lever assembly out of the brake-releasing position thereof into a brake-applying position thereof the rotary assembly will pull the cable connected thereto into a brake-operating position and maintain the same therein.

9. A parking brake mechanism as defined in claim 8 wherein said rotary assembly comprises a unitary structure.

10. A parking brake mechanism as defined in claim 9 wherein said exterior cylindrical surface is provided by said rotary assembly as a cylindrical member defining one side of said unitary structure, said cable connection being provided at a peripheral location on a remaining side of said unitary structure.

11. A parking brake mechanism as defined in claim 10 wherein the remaining side of said unitary structure includes an outwardly facing surface extending from said cable connection in an arcuate direction about the axis of said rotary assembly, said outwardly facing surface being constructed and arranged to guidingly engage said one end portion of the cable connected to said cable connection as said cable connection is moved in said arcuate path in said one direction.

12. A parking brake mechanism as defined in claim 11 wherein said spring system includes a spiral spring connected to the remaining side of said unitary structure.

13. A parking brake mechanism as defined in claim 12 wherein said end portion of said helical coil spring extends generally tangentially from an end volute of said series of volutes, said series of volutes including an opposite end volute having an opposite end portion extending generally tangentially therefrom and fixedly secured to said lever assembly.

14. A parking brake mechanism as defined in claim 13 wherein said actuatable releasing mechanism includes a releasing lever pivoted on said frame structure, said releasing lever being constructed and arranged to be actuated to moved from a normally inoperable position into a releasing position, said spring pressed pawl being constructed and arranged to be moved out of engagement with said at least one of the ratchet teeth by said releasing lever when said releasing lever is actuated and moved into the releasing position thereof.

* * * * *